(12) United States Patent
Asai

(10) Patent No.: US 10,615,379 B2
(45) Date of Patent: Apr. 7, 2020

(54) COMPOSITION FOR NON-AQUEOUS SECONDARY BATTERY ADHESIVE LAYER, ADHESIVE LAYER FOR NON-AQUEOUS SECONDARY BATTERY, AND NON-AQUEOUS SECONDARY BATTERY

(71) Applicant: ZEON CORPORATION, Chiyoda-ku, Tokyo (JP)

(72) Inventor: Kazuki Asai, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/776,540

(22) PCT Filed: Nov. 17, 2016

(86) PCT No.: PCT/JP2016/004912
§ 371 (c)(1),
(2) Date: May 16, 2018

(87) PCT Pub. No.: WO2017/090242
PCT Pub. Date: Jun. 1, 2017

(65) Prior Publication Data
US 2018/0342711 A1 Nov. 29, 2018

(30) Foreign Application Priority Data

Nov. 27, 2015 (JP) .................. 2015-232295

(51) Int. Cl.
| | |
|---|---|
| *H01M 2/16* | (2006.01) |
| *H01M 2/02* | (2006.01) |
| *C09J 201/00* | (2006.01) |
| *H01M 4/13* | (2010.01) |
| *H01M 10/058* | (2010.01) |
| *H01M 4/139* | (2010.01) |
| *H01M 4/62* | (2006.01) |
| *H01M 10/0525* | (2010.01) |
| *H01M 10/0585* | (2010.01) |
| *H01M 10/0587* | (2010.01) |
| *H01M 4/02* | (2006.01) |

(52) U.S. Cl.
CPC ......... *H01M 2/0287* (2013.01); *C09J 201/00* (2013.01); *H01M 2/16* (2013.01); *H01M 2/168* (2013.01); *H01M 2/1626* (2013.01); *H01M 4/13* (2013.01); *H01M 4/139* (2013.01); *H01M 4/622* (2013.01); *H01M 10/058* (2013.01); *H01M 10/0525* (2013.01); *H01M 10/0585* (2013.01); *H01M 10/0587* (2013.01); *H01M 2004/027* (2013.01); *H01M 2004/028* (2013.01); *H01M 2300/0017* (2013.01); *H01M 2300/0097* (2013.01)

(58) Field of Classification Search
None
See application file for complete search history.

(56) References Cited

U.S. PATENT DOCUMENTS

| | | | |
|---|---|---|---|
| 2015/0132499 A1 | 5/2015 | Kimura | |
| 2016/0141581 A1 | 5/2016 | Sasaki et al. | |

FOREIGN PATENT DOCUMENTS

| | | |
|---|---|---|
| JP | 2001084985 A | 3/2001 |
| JP | 2001181590 A | 7/2001 |
| JP | 2006096809 A | 4/2006 |
| JP | 2012204303 A | 10/2012 |
| JP | 2013145763 A | 7/2013 |
| JP | 2015088253 A | 5/2015 |
| JP | 2015141773 A | 8/2015 |
| WO | 2013172415 A1 | 11/2013 |
| WO | 2015005145 A1 | 1/2015 |
| WO | 2016103559 A1 | 6/2016 |

OTHER PUBLICATIONS

Jan. 17, 2017, International Search Report issued in the International Patent Application No. PCT/JP2016/004912.
May 29, 2018, International Preliminary Report on Patentability issued in the International Patent Application No. PCT/JP2016/004912.
Jun. 6, 2019, the Extended European Search Report issued by the European Patent Office in the corresponding European Patent Application No. 16868193.0.

*Primary Examiner* — Wojciech Haske
(74) *Attorney, Agent, or Firm* — Kenja IP Law PC

(57) ABSTRACT

A composition for a non-aqueous secondary battery adhesive layer contains organic particles and a water-soluble polymer. The water-soluble polymer has a 1 mass % aqueous solution viscosity of at least 500 mPa·s and not more than 9,000 mPa·s. Viscosity $\eta_0$ of the composition for a non-aqueous secondary battery adhesive layer at a shear rate of 100 s$^{-1}$ is at least 10 mPa·s and not more than 200 mPa·s, and a ratio of $\eta_0$ relative to viscosity $\eta_1$ of the composition for a non-aqueous secondary battery adhesive layer at a shear rate of 10,000 s$^{-1}$ is at least 1.5 and not more than 5.0.

8 Claims, No Drawings

COMPOSITION FOR NON-AQUEOUS SECONDARY BATTERY ADHESIVE LAYER, ADHESIVE LAYER FOR NON-AQUEOUS SECONDARY BATTERY, AND NON-AQUEOUS SECONDARY BATTERY

TECHNICAL FIELD

This disclosure relates to a composition for a non-aqueous secondary battery adhesive layer, an adhesive layer for a non-aqueous secondary battery, and a non-aqueous secondary battery.

BACKGROUND

Non-aqueous secondary batteries (hereinafter, also referred to simply as "secondary batteries"), such as lithium ion secondary batteries, have characteristics such as compact size, light weight, high energy density, and the ability to be repeatedly charged and discharged, and are used in a wide variety of applications. A secondary battery generally includes battery members such as a positive electrode, a negative electrode, and a separator that isolates the positive electrode and the negative electrode from one another and prevents short-circuiting between the positive and negative electrodes.

In recent years, battery members including a porous membrane layer with the aim of improving heat resistance and strength, an adhesive layer with the aim of improving adhesiveness between battery members, or the like have been used in secondary batteries.

Specifically, electrodes that further include an adhesive layer formed on an electrode substrate in which an electrode mixed material layer is provided on a current collector and separators that include an adhesive layer formed on a separator substrate have been used as battery members. An adhesive layer such as mentioned above is typically formed by supplying, onto a suitable substrate such as an electrode substrate or a separator substrate, a composition for a non-aqueous secondary battery adhesive layer (hereinafter, also referred to simply as a "composition for an adhesive layer") that is in the form of a slurry containing a binder component and a dispersion medium such as water, and then drying the composition for an adhesive layer (for example, refer to PTL 1).

PTL 1 proposes a technique of improving electrical characteristics of a non-aqueous secondary battery by integrating an electrode substrate including an electrode mixed material layer and a separator substrate through adhesion by an adhesive layer to inhibit cell swelling and increased inter-electrode distance associated with repeated charging and discharging. PTL 1 attempts to achieve good battery characteristics through formation of an adhesive layer using a small amount of adhesive.

CITATION LIST

Patent Literature

PTL 1: JP 2001-84985 A

SUMMARY

Technical Problem

However, although an adhesive layer formed using a composition for an adhesive layer in PTL 1 excels in terms of thin layer properties, there is room for improvement in terms of improving adhesiveness of the adhesive layer and low-temperature output characteristics of a non-aqueous secondary battery including the adhesive layer with a good balance.

Accordingly, an objective of this disclosure is to provide a composition for a non-aqueous secondary battery adhesive layer that can form an adhesive layer that has excellent adhesiveness and is capable of improving low-temperature output characteristics of a non-aqueous secondary battery.

Another objective of this disclosure is to provide an adhesive layer for a non-aqueous secondary battery that has excellent adhesiveness and can cause a non-aqueous secondary battery to display excellent low-temperature output characteristics.

Yet another objective of this disclosure is to provide a non-aqueous secondary battery having excellent low-temperature output characteristics.

Solution to Problem

In view of the points raised above, the inventor carried out extensive studies and eventually focused on a finding that the viscous behavior of a composition for an adhesive layer has a significant influence on adhesiveness of an adhesive layer and low-temperature output characteristics of a non-aqueous secondary battery including the adhesive layer. Specifically, thickness reduction of an adhesive layer such as in PTL 1 has previously been investigated with the aim of improving ion diffusivity between battery members and reducing cost, but the inventor reached a new finding that simply lowering the viscosity of a composition for an adhesive layer in order to thinly apply the composition for an adhesive layer onto a substrate may actually lead to loss of ion permeability of an adhesive layer formed using the composition for an adhesive layer. In relation to this problem, the inventor newly discovered that by setting viscosity $\eta_0$ at a low shear condition (shear rate of 100 s$^{-1}$) within a specific range such that fluidity of solid components in the composition for an adhesive layer after application thereof is reduced while setting a ratio ($\eta_0/\eta_1$) of $\eta_0$ relative to viscosity $\eta_1$ at a high shear condition (shear rate of 10,000 s$^{-1}$) such that the viscosity $\eta_1$ is within a range for which application is simple in consideration that high shear is normally applied to the composition for an adhesive layer during application onto a substrate, it is possible to further improve adhesiveness of an adhesive layer and battery characteristics of a secondary battery.

Specifically, this disclosure aims to advantageously solve the problems set forth above by disclosing a composition for a non-aqueous secondary battery adhesive layer comprising: organic particles; and a water-soluble polymer, wherein the water-soluble polymer has a 1 mass % aqueous solution viscosity of at least 500 mPa·s and not more than 9,000 mPa·s, viscosity $\eta_0$ of the composition for a non-aqueous secondary battery adhesive layer at a shear rate of 100 s$^{-1}$ is at least 10 mPa·s and not more than 200 mPa·s, and a ratio of $\eta_0$ relative to viscosity $\eta_1$ of the composition for a non-aqueous secondary battery adhesive layer at a shear rate of 10,000 s$^{-1}$ is at least 1.5 and not more than 5.0. A non-aqueous secondary battery adhesive layer composition having the properties set forth above can form an adhesive layer that has excellent adhesiveness and can cause a secondary battery to display excellent low-temperature output characteristics.

When a polymer is referred to as "water-soluble" in the present specification, this means that when 0.5 g of the substance is dissolved in 100 g of water at 25° C., insoluble content is less than 1.0 mass %. Also note that in the case of a substance for which the solubility thereof varies depending on the pH of water, the substance is considered to be "water-soluble" so long as there is at least one pH at which the substance satisfies the definition of "water-soluble" set forth above.

The "1 mass % aqueous solution viscosity" of a water-soluble polymer is a value obtained when a 1 mass % aqueous solution of the water-soluble polymer is prepared and then a B-type viscometer is used to measure the viscosity of the solution at pH 8 and 25° C. with a rotation speed of 60 rpm.

Moreover, the "viscosity $\eta_0$ of the composition for an adhesive layer at a shear rate of 100 s$^{-1}$" and the "viscosity $\eta_1$ of the composition for an adhesive layer at a shear rate of 10,000 s$^{-1}$" are viscosities at the corresponding shear rates with a measurement temperature of 25° C. and can be measured by a measurement method described in the EXAMPLES section of the present specification.

In the presently disclosed composition for a non-aqueous secondary battery adhesive layer, the water-soluble polymer preferably includes an ethylenically unsaturated carboxylic acid monomer unit in a proportion of at least 20 mass % and not more than 70 mass %. When the percentage content of an ethylenically unsaturated carboxylic acid monomer unit in the water-soluble polymer is within this specific range, adhesiveness of an adhesive layer and low-temperature output characteristics of a secondary battery can be improved with an even better balance.

The phrase "includes a monomer unit" as used herein means that "a polymer obtained with the monomer includes a structural unit derived from the monomer".

In the presently disclosed composition for a non-aqueous secondary battery adhesive layer, the organic particles preferably include an acid group-containing monomer unit. Through inclusion of an acid group-containing monomer unit in the organic particles, dispersibility and coatability of the composition for a non-aqueous secondary battery adhesive layer can be improved while also further improving adhesiveness of an adhesive layer.

In the presently disclosed composition for a non-aqueous secondary battery adhesive layer, the organic particles preferably include a (meth)acrylamide monomer unit. Through inclusion of a (meth)acrylamide monomer unit in the organic particles, dispersibility and coatability of the composition for a non-aqueous secondary battery adhesive layer can be improved while also further improving adhesiveness of an adhesive layer. Moreover, through inclusion of a (meth)acrylamide monomer unit in the organic particles, low-temperature output characteristics of a secondary battery including an adhesive layer that is formed using the composition for a non-aqueous secondary battery adhesive layer can be further improved.

Moreover, this disclosure aims to advantageously solve the problems set forth above by disclosing an adhesive layer for a non-aqueous secondary battery formed using the composition for a non-aqueous secondary battery adhesive layer set forth above. The adhesive layer for a non-aqueous secondary battery has excellent adhesiveness and can improve low-temperature output characteristics of a secondary battery.

Furthermore, this disclosure aims to advantageously solve the problems set forth above by disclosing a non-aqueous secondary battery comprising the adhesive layer for a non-aqueous secondary battery set forth above. The provision of the presently disclosed adhesive layer in a secondary battery in this manner can improve low-temperature output characteristics of the secondary battery.

The presently disclosed non-aqueous secondary battery is preferably a wound type or a laminate type. This is because the presently disclosed adhesive layer can display better adhesiveness when the secondary battery is formed as a wound type or a laminate type, which enables the achievement of good low-temperature output characteristics.

Advantageous Effect

According to this disclosure, it is possible to provide a composition for a non-aqueous secondary battery adhesive layer that is capable of forming an adhesive layer that displays excellent adhesiveness and can provide a secondary battery with excellent low-temperature output characteristics.

Moreover, according to this disclosure, it is possible to provide an adhesive layer for a non-aqueous secondary battery that has excellent adhesiveness and can cause a non-aqueous secondary battery to display excellent low-temperature output characteristics.

Furthermore, according to this disclosure, it is possible to provide a non-aqueous secondary battery having excellent low-temperature output characteristics.

DETAILED DESCRIPTION

The following provides a detailed description of embodiments of this disclosure.

Herein, the presently disclosed composition for a non-aqueous secondary battery adhesive layer is used as a material in production of an adhesive layer for adhering battery members, such as a separator substrate and an electrode substrate, to one another.

The presently disclosed adhesive layer for a non-aqueous secondary battery is formed using the composition for a non-aqueous secondary battery adhesive layer. The presently disclosed non-aqueous secondary battery includes at least the presently disclosed adhesive layer for a non-aqueous secondary battery.

(Composition for Non-Aqueous Secondary Battery Adhesive Layer)

The composition for a non-aqueous secondary battery adhesive layer is a slurry composition having water or the like as a dispersion medium that contains at least organic particles and a water-soluble polymer, and may optionally contain other components. A feature of the composition for a non-aqueous secondary battery adhesive layer is that the 1 mass % aqueous solution viscosity of the water-soluble polymer is within a specific range, and the viscosity $\eta_0$ of the composition for a non-aqueous secondary battery adhesive layer at a shear rate of 100 s$^{-1}$ and a ratio of $\eta_0$ relative to the viscosity $\eta_1$ of the composition for a non-aqueous secondary battery adhesive layer at a shear rate of 10,000 s$^{-1}$ are within specific ranges.

An adhesive layer formed using the presently disclosed composition for a non-aqueous secondary battery adhesive layer can display excellent adhesiveness and can cause a secondary battery to display excellent battery characteristics through the contribution of viscous behavior of the composition for an adhesive layer. Specifically, as a result of the 1 mass % aqueous solution viscosity of the water-soluble polymer in the presently disclosed composition for a non-aqueous secondary battery adhesive layer being at least 500 mPa·s and not more than 9,000 mPa·s, the viscosity $\eta_0$ of the composition for an adhesive layer at a shear rate of 100 s$^{-1}$ being within a specific range, and the ratio of $\eta_0$ relative to the viscosity $\eta_1$ of the composition for an adhesive layer at a shear rate of 10,000 s$^{-1}$ being within a specific range, coatability of the composition for an adhesive layer onto a substrate can be ensured while reducing post-application flow of solid components, inhibiting densification of the adhesive layer, and improving secondary battery low-temperature output characteristics.

<Organic Particles>

The organic particles contained in the composition for a non-aqueous secondary battery adhesive layer have a function of causing an adhesive layer formed using the composition for a non-aqueous secondary battery adhesive layer to display excellent adhesiveness. The organic particles may include a (meth)acrylic acid ester monomer unit. Moreover, the organic particles preferably include an acid group-containing monomer unit. Through inclusion of an acid group-containing monomer unit in the organic particles, dispersibility and coatability of the composition for a non-aqueous secondary battery adhesive layer can be improved while also further improving adhesiveness of an adhesive layer. Furthermore, the organic particles preferably include a (meth)acrylamide monomer unit. Through inclusion of a (meth)acrylamide monomer unit in the organic particles, dispersibility and coatability of the composition for a non-aqueous secondary battery adhesive layer can be improved while also further improving adhesiveness of an adhesive layer. Moreover, the inclusion of a (meth)acrylamide monomer unit in the organic particles can further improve low-temperature output characteristics of a secondary battery including an adhesive layer that is formed using the composition for a non-aqueous secondary battery adhesive layer. In the present specification, "(meth)acryl" is used to indicate "acryl" and/or "methacryl".

[(Meth)Acrylic Acid Ester Monomer Unit]

Examples of (meth)acrylic acid ester monomers that can form the (meth)acrylic acid ester monomer unit include (meth)acrylic acid ester monomers such as methyl (meth)acrylate, ethyl (meth)acrylate, butyl (meth)acrylate, and 2-ethylhexyl acrylate.

The percentage content of the (meth)acrylic acid ester monomer unit in the organic particles when all monomer units included in the organic particles are taken to be 100 mass % is preferably 50.0 mass % or more, more preferably 55.0 mass % or more, and even more preferably 65.0 mass % or more, and is preferably 99.0 mass % or less, and more preferably 95.0 mass % or less. When the percentage content of the (meth)acrylic acid ester monomer unit in the organic particles is at least any of the lower limits set forth above, excessive lowering of the glass-transition temperature of the organic particles can be avoided and blocking resistance of an obtained adhesive layer can be improved. When a separator or electrode in which an adhesive layer is formed is, for example, stored in a state in which stacking has been performed with the adhesive layer in-between, adhesion between adjacent separators or electrodes can be inhibited in a case in which blocking resistance of the adhesive layer is high.

[Acid Group-Containing Monomer Unit]

Examples of acid group-containing monomers that can form the acid group-containing monomer unit include monomers that include an acid group such as carboxylic acid group-containing monomers, sulfonate group-containing monomers, phosphate group-containing monomers, and hydroxy group-containing monomers.

Examples of carboxylic acid group-containing monomers include monocarboxylic acids and dicarboxylic acids. Examples of monocarboxylic acids include acrylic acid, methacrylic acid, and crotonic acid. Examples of dicarboxylic acids include maleic acid, fumaric acid, and itaconic acid.

Examples of sulfonate group-containing monomers include vinyl sulfonic acid, methyl vinyl sulfonic acid, (meth)allyl sulfonic acid, (meth)acrylic acid-2-ethyl sulfonate, 2-acrylamido-2-methylpropane sulfonic acid, and 3-allyloxy-2-hydroxypropane sulfonic acid.

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

Examples of hydroxy group-containing monomers include 2-hydroxyethyl acrylate, 2-hydroxypropyl acrylate, 2-hydroxyethyl methacrylate, and 2-hydroxypropyl methacrylate.

Herein, "(meth)allyl" is used to indicate "allyl" and/or "methallyl", and "(meth)acryloyl" is used to indicate "acryloyl" and/or "methacryloyl".

The percentage content of the acid group-containing monomer unit in the organic particles when all monomer units included in the organic particles are taken to be 100 mass % is preferably 0.1 mass % or more, more preferably 0.5 mass % or more, and even more preferably 1.0 mass % or more, and is preferably 4.5 mass % or less, and more preferably 4.0 mass % or less. When the percentage content of the acid group-containing monomer unit in the organic particles is at least any of the lower limits set forth above, adhesiveness of an adhesive layer can be further improved. Moreover, when the percentage content of the acid group-containing monomer unit in the organic particles is not more than any of the upper limits set forth above, it is possible to prevent the density of an adhesive layer becoming excessively high and to further improve low-temperature output characteristics of an obtained secondary battery.

[(Meth)Acrylamide Monomer Unit]

Examples of monomers that can form the (meth)acrylamide monomer unit include (meth)acrylamide monomers such as N-hydroxymethyl(meth)acrylamide, acrylamide, and methacrylamide.

The percentage content of the (meth)acrylamide monomer unit in the organic particles when all monomer units in the organic particles are taken to be 100 mass % is preferably 0.1 mass % or more, and more preferably 0.5 mass % or more, and is preferably 10.0 mass % or less, and more preferably 5.0 mass % or less. When the percentage content of the (meth)acrylamide monomer unit in the organic particles is at least any of the lower limits set forth above, low-temperature output characteristics of a secondary battery including an adhesive layer that is formed using the composition for a non-aqueous secondary battery adhesive layer can be further improved. When the percentage content of the (meth)acrylamide monomer unit in the organic particles is not more than any of the upper limits set forth above, low-temperature output characteristics of a secondary battery including an adhesive layer that is formed using the composition for a non-aqueous secondary battery adhesive layer can be further improved while also preventing excessive reduction of viscosity at a low shear rate.

[Other Monomer Units]

The organic particles may include monomer units other than the (meth)acrylic acid ester monomer unit, acid group-containing monomer unit, and (meth)acrylamide monomer unit set forth above without any specific limitations so long as the organic particles can display adhesiveness. Examples of monomers that can form such other monomer units include various monomers such as described below. For example, vinyl chloride monomers such as vinyl chloride and vinylidene chloride; vinyl acetate monomers such as vinyl acetate; aromatic vinyl monomers such as styrene, α-methylstyrene, styrene sulfonic acid, butoxystyrene, and vinylnaphthalene; vinylamine monomers such as vinylamine; vinylamide monomers such as N-vinylformamide and N-vinylacetamide; (meth)acrylonitrile monomers such as acrylonitrile and methacrylonitrile; fluorine-containing (meth)acrylate monomers such as 2-(perfluorohexyl)ethyl methacrylate and 2-(perfluorobutyl)ethyl acrylate; maleimide; maleimide derivatives such as phenylmaleimide; diene monomers such as 1,3-butadiene and isoprene; and the like may be used. One of these monomers may be used individually, or two or more of these monomers may be used in combination in a freely selected ratio.

Herein, "(meth)acrylate" is used to indicate "acrylate" and/or "methacrylate", and "(meth)acrylonitrile" is used to indicate "acrylonitrile" and/or "methacrylonitrile".

In addition to these monomer units, the organic particles preferably include a crosslinkable monomer unit. Crosslinkable monomers that can form the crosslinkable monomer unit are monomers that can form a crosslinked structure during or after polymerization through heating or irradiation with energy rays.

Examples of crosslinkable monomers that can be used include polyfunctional monomers having at least two groups that display polymerization reactivity. Examples of such polyfunctional monomers include divinyl compounds such as divinylbenzene and allyl methacrylate; di(meth)acrylic acid ester compounds such as diethylene glycol dimethacrylate, ethylene glycol dimethacrylate, diethylene glycol diacrylate, and 1,3-butylene glycol diacrylate; tri(meth)acrylic acid ester compounds such as trimethylolpropane trimethacrylate and trimethylolpropane triacrylate; and epoxy group-containing ethylenically unsaturated monomers such as allyl glycidyl ether and glycidyl methacrylate. One of these monomers may be used individually, or two or more of these monomers may be used in combination in a freely selected ratio.

Note that the combination and compounding ratio of the various monomers described above in production of the organic particles can be freely adjusted in accordance with the intended use of the composition for an adhesive layer, for example.

Structure of Organic Particles

The organic particles may have any structure and may, for example, have a core-shell structure including a core portion and a shell portion that covers an outer surface of the core portion. Note that the shell portion may partially cover the outer surface of the core portion. In other words, a mode of coating in which the shell portion of an organic particle covers the outer surface of the core portion but does not cover the entire outer surface of the core portion may be adopted.

The organic particles may include optional elements other than the core portion and the shell portion described above so long as the desired effects are not significantly lost. Specifically, the organic particles may, for example, include a portion inside of the core portion that is formed from a different polymer to the core portion. In one specific example, a residual seed particle may be present inside of the core portion in a situation in which seed particles are used in production of the organic particles by seeded polymerization.

Glass-Transition Temperature of Organic Particles

The glass-transition temperature of the organic particles is preferably 30° C. or higher, and more preferably 40° C. or higher, and is preferably 130° C. or lower, more preferably 120° C. or lower, and even more preferably 110° C. or lower. In a case in which the organic particles have a core-shell structure such as previously described, the glass-transition temperature of a polymer forming the shell portion is preferably within any of the ranges set forth above. When the glass-transition temperature of the organic particles is within any of the ranges set forth above, a good balance of blocking resistance and adhesiveness of an adhesive layer can be achieved.

The glass-transition temperature of the organic particles can be adjusted to a desired temperature by changing the chemical composition and molecular weight of the organic particles.

Particularly in the case of a core-shell structure, the glass-transition temperature of the shell portion strongly influences blocking resistance. On the other hand, the adhesiveness of an adhesive layer is determined by the glass-transition temperature of both the core portion and the shell portion.

The "glass-transition temperature" of organic particles referred to in the present specification can be measured by a measurement method described in the EXAMPLES section of the present specification.

Production Method of Organic Particles

The organic particles can be produced by a known polymerization method without any specific limitations. The mode of polymerization is not specifically limited and may, for example, be solution polymerization, suspension polymerization, bulk polymerization, or emulsion polymerization. The polymerization method may, for example, be ionic polymerization, radical polymerization, living radical polymerization, or the like. In emulsion polymerization, seeded polymerization in which seed particles are used may be adopted. In the case of production of organic particles having a core-shell structure, continuous multistep suspension polymerization and multistep suspension polymerization that are stepwise polymerization methods in which a polymer formed in a preceding step is then coated with a polymer formed in a subsequent step may be adopted.

An emulsifier, dispersant, polymerization initiator, polymerization aid, or the like used in polymerization may be the same as typically used and the amount thereof may also be the same as typically used.

<Water-Soluble Polymer>

The water-soluble polymer contained in the composition for a non-aqueous secondary battery adhesive layer has a function of adjusting the viscosity of the composition for a non-aqueous secondary battery adhesive layer to within a desired range. It is preferable that the water-soluble polymer displays adhesiveness and electrolysis solution resistance, and acts to assist adhesion between components in an adhesive layer and between battery members in a secondary battery.

Viscosity of Water-Soluble Polymer

More specifically, the water-soluble polymer is required to have a 1 mass % aqueous solution viscosity of at least 500 mPa·s and not more than 9,000 mPa·s. The 1 mass % aqueous solution viscosity of the water-soluble polymer is preferably 3,000 mPa·s or more, and more preferably 4,000 mPa·s or more, and is preferably 8,000 mPa·s or less, and more preferably 7,000 mPa·s or less.

Through compounding of a water-soluble polymer for which the 1 mass % aqueous solution viscosity is within any of the ranges set forth above, the viscosity of the composition for a non-aqueous secondary battery adhesive layer can easily be adjusted to within the specific range described above, adhesiveness of an obtained adhesive layer can be further improved, and low-temperature output characteristics of a secondary battery including the adhesive layer can be further improved. Specifically, by setting the viscosity of the water-soluble polymer as at least any of the lower limits set forth above, the composition for a non-aqueous secondary battery adhesive layer can display an appropriate degree of structural viscosity, the flow of solid components in the composition for an adhesive layer after application onto a substrate can be restricted, and excessive adhesive layer densification can be prevented. More specifically, by restricting the flow of solid components, sedimentation of the solid components can be inhibited and clogging of a porous substrate, such as a separator substrate, can be inhibited. This can both inhibit densification of the adhesive layer itself and preserve pores in a battery member (for example, a separator) that includes the adhesive layer. Consequently, ion diffusivity can be increased, which enables improvement of battery characteristics such as low-temperature output characteristics. On the other hand, by setting the viscosity of the water-soluble polymer as not more than any of the upper limits set forth above, levelling properties of the composition for a non-aqueous secondary battery adhesive layer can be improved, an excessive increase of pores in an obtained adhesive layer can be inhibited, and adhesiveness of the adhesive layer can be ensured, which enables improvement of low-temperature output characteristics.

Type of Water-Soluble Polymer

The water-soluble polymer is not specifically limited other than being a polymer that is water-soluble and has a 1 mass % aqueous solution viscosity within any of the ranges set forth above. For example, a natural polymer, a semi-synthetic polymer, or a synthetic polymer may be used as the water-soluble polymer.

[Natural Polymer]

Examples of natural polymers that may be used include polysaccharides and proteins derived from plants and animals, fermentation treated products of these polysaccharides and proteins by microorganisms or the like, and heat-treated products of these polysaccharides and proteins.

These natural polymers can be classified as plant-based natural polymers, animal-based natural polymers, microorganism-produced natural polymers, and so forth.

Examples of plant-based natural polymers include gum arabic, gum tragacanth, galactan, guar gum, carob gum, karaya gum, carrageenan, pectin, kannan, quince seed (marmelo), algal colloid (phaeophyceae extract), starch (for example, starch derived from rice, corn, potato, or wheat), and glycyrrhizin. Examples of animal-based natural polymers include collagen, casein, albumin, and gelatin. Examples of microorganism-produced natural polymers include xanthan gum, dextran, succinoglucan, and pullulan.

[Semi-Synthetic Polymers]

Examples of semi-synthetic polymers that may be used include cellulosic semi-synthetic polymers. Cellulosic semi-synthetic polymers can be categorized as non-ionic cellulosic semi-synthetic polymers, anionic cellulosic semi-synthetic polymers, and cationic cellulosic semi-synthetic polymers.

Examples of non-ionic cellulosic semi-synthetic polymers include alkyl celluloses such as methyl cellulose, methyl ethyl cellulose, ethyl cellulose, and microcrystalline cellulose; and hydroxyalkyl celluloses such as hydroxyethyl cellulose, hydroxybutyl methyl cellulose, hydroxypropyl cellulose, hydroxypropyl methyl cellulose, hydroxyethyl methyl cellulose, hydroxypropyl methyl cellulose stearoxy ether, carboxymethyl hydroxyethyl cellulose, alkyl hydroxyethyl cellulose, and nonoxynyl hydroxyethyl cellulose.

Examples of anionic cellulosic semi-synthetic polymers include substitution products obtained by substitution of the non-ionic cellulosic semi-synthetic polymers described above with various derivative groups and salts (sodium salts, ammonium salts, and the like) of these substitution products. Specific examples include sodium cellulose sulfate, methyl cellulose, methyl ethyl cellulose, ethyl cellulose, carboxymethyl cellulose (CMC), and salts thereof.

Examples of cationic cellulosic semi-synthetic polymers include low nitrogen hydroxyethyl cellulose dimethyldiallyl ammonium chloride (polyquaternium-4), O-[2-hydroxy-3-(trimethylammonio)propyl]hydroxyethyl cellulose chloride (polyquaternium-10), and O-[2-hydroxy-3-(lauryldimethylammonio)propyl]hydroxyethyl cellulose chloride (polyquaternium-24).

[Synthetic Polymers]

Examples of synthetic polymers that may be used include synthetic polymers obtained through polymerization of a monomer composition containing, in a specific proportion, an ethylenically unsaturated carboxylic acid compound that includes either or both of an ethylenically unsaturated carboxylic acid and a salt thereof. In a situation in which such a synthetic polymer is used as the water-soluble polymer, secondary battery internal resistance can be further reduced.

The ethylenically unsaturated carboxylic acid compound can be either or both of an ethylenically unsaturated carboxylic acid and a salt thereof. Examples of ethylenically unsaturated carboxylic acids that may be used include ethylenically unsaturated monocarboxylic acids, derivatives of ethylenically unsaturated monocarboxylic acids, ethylenically unsaturated dicarboxylic acids, acid anhydrides of ethylenically unsaturated dicarboxylic acids, and derivatives of ethylenically unsaturated dicarboxylic acids and acid anhydrides thereof. Examples of ethylenically unsaturated carboxylic acid salts that may be used include sodium salts, potassium salts, and lithium salts of ethylenically unsaturated carboxylic acids.

One ethylenically unsaturated carboxylic acid or ethylenically unsaturated carboxylic acid salt may be used individually, or two or more ethylenically unsaturated carboxylic acids and/or ethylenically unsaturated carboxylic acid salts may be used in combination in a freely selected ratio.

Examples of ethylenically unsaturated monocarboxylic acids that may be used include acrylic acid, methacrylic acid, and crotonic acid. Examples of derivatives of ethylenically unsaturated monocarboxylic acids that may be used include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of ethylenically unsaturated dicarboxylic acids that may be used include maleic acid, fumaric acid, and itaconic acid. Examples of acid anhydrides of ethylenically unsaturated dicarboxylic acids that may be used include maleic anhydride, diacrylic anhydride, methyl maleic anhydride, and dimethyl maleic anhydride. Examples of derivatives of ethylenically unsaturated dicarboxylic acids that may be used include methylmaleic acid, dimethylmaleic acid, phenylmaleic acid, chloromaleic acid, dichloromaleic acid, and fluoromaleic acid.

The proportion constituted by the ethylenically unsaturated carboxylic acid compound described above in a monomer composition used to produce the synthetic polymer is preferably 20 mass % or more, more preferably 25 mass % or more, and even more preferably 30 mass % or more, and is preferably 70 mass % or less, more preferably 65 mass % or less, and even more preferably 60 mass % or less. In a situation in which the synthetic polymer is used as the water-soluble polymer in the presently disclosed composition, setting the percentage content of an ethylenically unsaturated carboxylic acid monomer unit in the synthetic polymer produced using the monomer composition within any of the ranges set forth above enables the viscosity of the water-soluble polymer at 1 mass % aqueous solution concentration to be set within any of the previously described ranges.

Note that in a polymer that is produced through copolymerization of a plurality of types of monomers, the proportion constituted in the polymer by a structural unit that is formed through polymerization of a given monomer is normally the same as the ratio (charging ratio) of the given monomer among all monomers used in polymerization of the polymer.

The monomer composition may contain another compound that is copolymerizable with the ethylenically unsaturated carboxylic acid compound. Specific examples of other compounds that may be used include (meth)acrylic acid esters such as methyl (meth)acrylate, ethyl (meth)acrylate, n-propyl (meth)acrylate, isopropyl (meth)acrylate, n-butyl (meth)acrylate, t-butyl (meth)acrylate, pentyl (meth)acrylate, hexyl (meth)acrylate, heptyl (meth)acrylate, octyl (meth)acrylate, nonyl (meth)acrylate, decyl (meth)acrylate, lauryl (meth)acrylate, n-tetradecyl (meth)acrylate, stearyl (meth)acrylate, perfluoroalkylethyl (meth)acrylate, and phenyl (meth)acrylate; (meth)acrylamide; vinyl acetate; glycidyl methacrylate; and 2-vinylpyridine.

Of these compounds, the percentage content of a (meth) acrylic acid ester in the monomer composition is preferably 15 mass % or more, and more preferably 40 mass % or more, and is preferably 80 mass % or less, and more preferably 70 mass % or less. When the percentage content of the (meth) acrylic acid ester is at least any of the lower limits set forth above, it is possible to further improve low-temperature output characteristics of a secondary battery including an adhesive layer that is formed using a composition for an adhesive layer containing a synthetic polymer obtained using the monomer composition. Moreover, when the percentage content of the (meth)acrylic acid ester is not more than any of the upper limits set forth above, a composition for an adhesive layer containing a synthetic polymer obtained using the monomer composition can be used to inhibit excessive increase in density and improve adhesiveness of the formed adhesive layer.

Examples of additives that may be used in the monomer composition used for preparing the synthetic polymer include known additives that can be used in a polymerization reaction such as crosslinking agents (for example, ethylene glycol dimethacrylate), polymerization initiators (for example, potassium persulfate), and polymerization promoters (for example, tetramethylethylenediamine). The type and amount of such additives may be freely selected in accordance with the polymerization method and so forth.

A polymerization solvent that is used in the monomer composition used for preparation of the water-soluble polymer may be a known solvent that is selected in accordance with the polymerization method and so forth and in which the above-described monomers can be dissolved or dispersed. Of such solvents, water is preferable as the polymerization solvent. Moreover, the polymerization solvent may be an aqueous solution of a freely selected compound or a mixed solution of water and a small amount of an organic medium.

The synthetic polymer can be obtained, for example, through radical polymerization of a monomer composition obtained by mixing the above-described monomers, crosslinking agent, additives, and polymerization solvent by a known method. A solution containing the synthetic polymer and the polymerization solvent that is obtained through polymerization of the monomer composition may be used in an as-produced state to prepare the composition for an adhesive layer or may be used to prepare the composition for an adhesive layer after solvent substitution, addition of optional components, or the like has been performed.

The polymerization method may be a commonly known polymerization method such as aqueous solution polymerization, slurry polymerization, suspension polymerization, or emulsion polymerization. However, aqueous solution polymerization using water as the polymerization solvent is preferable in that a solvent removal operation is not required, solvent safety is high, and there are no issues related to mixing in of a surfactant. The aqueous solution polymerization is a method in which a monomer composition is adjusted to a specific concentration and sufficient purging of dissolved oxygen in the reaction system with an inert gas is performed prior to carrying out a polymerization reaction by adding a radical polymerization initiator and performing heating or light irradiation with ultraviolet light or the like as necessary.

When water is used as the polymerization solvent and the above-described monomer composition is polymerized in water to prepare an aqueous solution containing the synthetic polymer, the aqueous solution is preferably adjusted to a pH of at least 8 and not higher than 9 after the polymerization.

Compounding Ratio of Water-Soluble Polymer

The compounding ratio of the water-soluble polymer in the composition for a non-aqueous secondary battery adhesive layer relative to 100 parts by mass of the organic particles is preferably 0.05 parts by mass or more, more preferably 0.1 parts by mass or more, and even more preferably 0.5 parts by mass or more, and is preferably 5 parts by mass or less, and more preferably 3 parts by mass or less. Although the water-soluble polymer has a function of imparting viscosity to the composition for an adhesive layer and improving adhesiveness of an adhesive layer as previously described, excessive addition thereof may lead to loss of flexibility or ion diffusivity of the adhesive layer and may cause deterioration of low-temperature output characteristics of a secondary battery.

<Other Components>

The composition for a non-aqueous secondary battery adhesive layer may contain optional components other than the above-described organic particles and water-soluble polymer. Examples of such other components include any binder for an adhesive layer that differs from the above-described organic particles and known additives such as wetting agents, viscosity modifiers, and additives for electrolysis solution. One of these other components may be used individually, or two or more of these other components may be used in combination. The use of a binder for an adhesive layer can inhibit detachment of components such as the organic particles from an adhesive layer.

Binder for Adhesive Layer

The binder for an adhesive layer that may be contained in the presently disclosed composition for a non-aqueous secondary battery adhesive layer may, for example, be a known binder such as a thermoplastic elastomer that is water-insoluble and can be dispersed in a dispersion medium such as water. The thermoplastic elastomer is preferably a conjugated diene polymer or an acrylic polymer, and more preferably an acrylic polymer.

The conjugated diene polymer is a polymer that includes a conjugated diene monomer unit, and specific examples thereof include a polymer including an aromatic vinyl monomer unit and an aliphatic conjugated diene monomer unit such as a styrene-butadiene copolymer (SBR), and acrylic rubber (NBR) (polymer including acrylonitrile unit and butadiene unit). The acrylic polymer is a polymer that includes a (meth)acrylic acid ester monomer unit. Examples of (meth)acrylic acid ester monomers that can be used to form the (meth)acrylic acid ester monomer unit include the same monomers as can be used in production of the organic particles.

One of such binders for an adhesive layer may be used individually, or two or more of such binders for an adhesive layer may be used in combination.

It is more preferable that an acrylic polymer used as a binder for an adhesive layer includes a (meth)acrylonitrile monomer unit. This can increase adhesive layer strength.

The glass-transition temperature of the binder for an adhesive layer is preferably −50° C. or higher, and more preferably −40° C. or higher, and is preferably 10° C. or lower. Adhesiveness of an adhesive layer can be increased by setting the glass-transition temperature of the binder for an adhesive layer within any of the ranges set forth above. The "glass-transition temperature" of a binder for an adhesive layer referred to in the present specification can be measured by a measurement method described in the EXAMPLES section of the present specification.

Examples of methods by which the binder for an adhesive layer can be produced include solution polymerization, suspension polymerization, and emulsion polymerization. Of these methods, emulsion polymerization and suspension polymerization are preferable because polymerization can be carried out in water and a water dispersion containing the binder for an adhesive layer in a particulate form can suitably be used as-produced as a material for the composition for an adhesive layer. In production of the polymer used as the binder for an adhesive layer, it is preferable that a dispersant is present in the reaction system. In general, the binder for an adhesive layer is substantially composed by the constituent polymer thereof but may also be accompanied by other optional components such as an additive used in polymerization.

In a case in which a binder for an adhesive layer is compounded in the composition for a non-aqueous secondary battery adhesive layer, the amount of the binder for an adhesive layer relative to 100 parts by mass of the organic particles is preferably at least 10 parts by mass and not more than 50 parts by mass.

<Production Method of Composition for Non-Aqueous Secondary Battery Adhesive Layer>

A production method of the composition for an adhesive layer includes a step of mixing organic particles, a water-soluble polymer having a 1 mass % aqueous solution viscosity of at least 500 mPa·s and not more than 9,000 mPa·s, water as a dispersion medium, and other components that are used as necessary. Although the mixing can be carried out by any method, the mixing is normally carried out using a disperser as a mixer to efficiently disperse the components.

The disperser is preferably a device that enables homogeneous dispersion and mixing of the components. Examples of such devices include a ball mill, a sand mill, a pigment disperser, a grinding machine, an ultrasonic disperser, a homogenizer, and a planetary mixer. Moreover, a high-level dispersing device such as a bead mill, a roll mill, or a FILMIX may be used from a viewpoint of enabling the application of high shear force during dispersing.

<Properties of Composition for Non-Aqueous Secondary Battery Adhesive Layer>

The viscosity $\eta_0$ of the resultant composition for a non-aqueous secondary battery adhesive layer at a shear rate of 100 s$^{-1}$ is required to be at least 10 mPa·s and not more than 200 mPa·s, is preferably 50 mPa·s or more, and more preferably 60 mPa·s or more, and is preferably 150 mPa·s or less. When $\eta_0$ is at least the lower limit of any of the ranges set forth above, it is possible to restrict the flow of solid components in the composition for an adhesive layer after application onto a substrate and inhibit adhesive layer densification. By restricting the flow of solid components, sedimentation of the solid components can be inhibited, and substrate clogging can be prevented. Consequently, pores in an obtained battery member, such as a separator, can be preserved, ion diffusivity can be increased, and low-temperature output characteristics can be improved. When $\eta_0$ is not more than the upper limit of any of the ranges set forth above, leveling properties of the composition for an adhesive layer can be improved such as to enable flattening of the surface of an obtained adhesive layer. Moreover, an excessive increase of pores in the obtained adhesive layer can be inhibited and adhesiveness of the adhesive layer in electrolysis solution can be ensured, which enables improvement of secondary battery low-temperature output characteristics.

A ratio ($\eta_0/\eta_1$) of the viscosity $\eta_0$ of the composition for a non-aqueous secondary battery adhesive layer at a shear rate of 100 s$^{-1}$ relative to the viscosity $\eta_1$ of the composition for a non-aqueous secondary battery adhesive layer at a shear rate of 10,000 s$^{-1}$ is required to be at least 1.5 and not more than 5.0, is preferably 2.0 or more, and more preferably 2.5 or more, and is preferably 4.0 or less. When $\eta_0/\eta_1$ is at least the lower limit of any of the ranges set forth above, the occurrence of high viscosity under high-shear conditions is inhibited, the occurrence of "sagging" or "unevenness" in application of the composition for an adhesive layer is inhibited, and coatability of the composition for an adhesive layer on a substrate is ensured. Moreover, when $\eta_0/\eta_1$ is not more than the upper limit of any of the ranges set forth above, an excessive increase of pores in an obtained adhesive layer can be inhibited and adhesiveness of the adhesive layer in electrolysis solution can be ensured, which enables improvement of low-temperature output characteristics.

Note that $\eta_0$, $\eta_1$, and $\eta_0/\eta_1$ can be appropriately adjusted by adjusting the content of the organic particles and the water-soluble polymer in the composition for an adhesive layer, the viscosity of the water-soluble polymer, the chemical composition of the water-soluble polymer, and so forth.

(Adhesive Layer for Non-Aqueous Secondary Battery)

The composition for a non-aqueous secondary battery adhesive layer set forth above can be used to form an adhesive layer on an appropriate substrate. Specifically, an adhesive layer for a non-aqueous secondary battery can be formed by drying the composition for a non-aqueous secondary battery adhesive layer on an appropriate substrate. In other words, the presently disclosed adhesive layer for a non-aqueous secondary battery is composed of a dried product of the composition for a non-aqueous secondary battery adhesive layer set forth above and normally contains the organic particles, the water-soluble polymer, and other optional components. In a case in which the polymer in the above-described organic particles and/or the binder for an adhesive layer includes a crosslinkable monomer unit, the polymer in the organic particles and/or the binder for an adhesive layer may be crosslinked during slurry composition drying or through optional heat treatment performed after the drying (i.e., the adhesive layer for a non-aqueous secondary battery may contain a crosslinked product of the above-described organic particles and/or binder for an adhesive layer). Note that the preferred ratio of components contained in the adhesive layer for a non-aqueous secondary battery is the same as the preferred ratio of these components in the composition for a non-aqueous secondary battery adhesive layer.

Moreover, the organic particles that are present as particles in the composition for a non-aqueous secondary battery adhesive layer may maintain their particulate form in the adhesive layer or may change form. In a case in which organic particles having a core-shell structure are contained in the composition for an adhesive layer, it is preferable that the core-shell structure itself is maintained even if the form of the organic particles overall changes from the original particulate form.

The presently disclosed adhesive layer for a non-aqueous secondary battery can display high adhesiveness and improve low-temperature output characteristics of a non-aqueous secondary battery.

<Substrate>

No specific limitations are placed on the substrate on which the adhesive layer is formed. For example, the substrate may be a separator substrate in a situation in which the adhesive layer is used as an element that constitutes part of a separator or may be an electrode substrate obtained by forming an electrode mixed material layer on a current collector in a situation in which the adhesive layer is used as an element that constitutes part of an electrode. The adhesive layer formed on the substrate can be used in any way. For example, the adhesive layer may be formed on a separator substrate or the like to form a product that is used as-produced as a battery member such as a separator; the adhesive layer may be formed on an electrode substrate to form an electrode; or the adhesive layer may be formed on a releasable substrate, and may then be peeled off the substrate and attached to another substrate for use as a battery member.

However, it is preferable that a separator substrate or an electrode substrate is used as the substrate from a viewpoint of raising battery member production efficiency since a step of peeling a releasable substrate from the adhesive layer can be omitted.

[Separator Substrate]

The separator substrate on which the adhesive layer may be formed is not specifically limited and may be a separator substrate such as described, for example, in JP 2012-204303 A. Of these separator substrates, a microporous membrane made of polyolefinic (polyethylene, polypropylene, polybutene, or polyvinyl chloride) resin is preferred because such a membrane can reduce the total thickness of the separator, which increases the ratio of electrode active material in a secondary battery, and consequently increases the capacity per volume.

Any layer other than the adhesive layer that can perform a desired function may be adopted with respect to the separator substrate.

[Electrode Substrate]

The electrode substrate (positive/negative electrode substrate) on which the adhesive layer may be formed is not specifically limited and may, for example, be an electrode substrate obtained by forming an electrode mixed material layer on a current collector.

Herein, the current collector, components in the electrode mixed material layer (for example, an electrode active material (positive/negative electrode active material) and a binder for an electrode mixed material layer (binder for positive/negative electrode mixed material layer)), and the method by which the electrode mixed material layer is formed on the current collector may be known examples thereof such as described, for example, in JP 2013-145763 A.

Note that the electrode substrate may include, as part thereof, any layer other than the adhesive layer that has a desired function.

[Releasable Substrate]

The releasable substrate on which the adhesive layer may be formed is not specifically limited and may be any known releasable substrate.

<Formation Method of Adhesive Layer for Non-Aqueous Secondary Battery>

Examples of methods by which the adhesive layer may be formed on a substrate, such as the above-described separator substrate or electrode substrate, include:

(1) a method in which the composition for an adhesive layer is applied onto the surface of a separator substrate or electrode substrate (surface at electrode mixed material layer side in the case of an electrode substrate; same applies below) and is then dried;

(2) a method in which a separator substrate or electrode substrate is immersed in the composition for an adhesive layer and is then dried; and (3) a method in which the composition for an adhesive layer is applied onto a releasable substrate and is dried to produce an adhesive layer that is then transferred onto the surface of a separator substrate or electrode substrate.

Of these methods, method (1) is particularly preferable since it allows simple control of the thickness of the adhesive layer. Method (1) more specifically includes a step of applying the composition for an adhesive layer onto a separator substrate or electrode substrate (application step) and a step of drying the composition for an adhesive layer that has been applied onto the separator substrate or electrode substrate to form an adhesive layer (drying step).

No specific limitations are placed on the method by which the composition for an adhesive layer is applied onto the separator substrate or electrode substrate in the application step. For example, a method such as spray coating, doctor blading, reverse roll coating, direct roll coating, gravure coating, extrusion coating, or brush coating may be used. Of these methods, gravure coating is preferable in terms of enabling formation of a thinner adhesive layer.

The composition for an adhesive layer on the substrate may be dried by any commonly known method in the drying step without any specific limitations. For example, the drying may be carried out through drying by warm, hot, or low-humidity air; drying in a vacuum; or drying by irradiation with infrared light or electron beams. Although no specific limitations are placed on the drying conditions, the drying temperature is preferably 30° C. to 80° C. and the drying time is preferably 30 seconds to 10 minutes.

The thickness of the adhesive layer formed on the substrate is preferably 0.1 µm or more, more preferably 0.3 µm or more, and even more preferably 0.5 µm or more, and is preferably 3.0 µm or less, more preferably 1.5 µm or less, and even more preferably 1.0 µm or less. When the thickness of the adhesive layer is at least the lower limit of any of the ranges set forth above, sufficient strength of the adhesive layer can be ensured, and when the thickness of the adhesive layer is not more than the upper limit of any of the ranges set forth above, ion diffusivity of the adhesive layer can be ensured and secondary battery low-temperature output characteristics can be further improved.

(Non-Aqueous Secondary Battery)

The presently disclosed non-aqueous secondary battery includes the presently disclosed adhesive layer for a non-aqueous secondary battery set forth above. More specifically, the presently disclosed non-aqueous secondary battery includes the presently disclosed adhesive layer for a non-aqueous secondary battery on one or more of a positive electrode, a negative electrode, and a separator, or between these battery members and a battery container.

The presently disclosed non-aqueous secondary battery has excellent low-temperature output characteristics as a result of including the presently disclosed adhesive layer for a non-aqueous secondary battery.

In particular, the presently disclosed non-aqueous secondary battery is preferably a wound type or a laminate type. This is because when the secondary battery is shaped as a wound type or a laminate type, the presently disclosed adhesive layer displays better adhesiveness as a result of a heat pressing step being implemented, for example, which enables the achievement of good low-temperature output characteristics.

<Positive Electrode and Negative Electrode>

As previously explained, the presently disclosed secondary battery includes the adhesive layer in one or more of the positive electrode, the negative electrode, and the separator, or between these battery members and a battery container. In other words, an electrode in which the adhesive layer is provided on an electrode substrate obtained by forming an electrode mixed material layer on a current collector may be used. Examples of electrode substrates and separator substrates that can be used include the same examples as in the "Adhesive layer for non-aqueous secondary battery" section.

Moreover, in the case of a positive electrode or negative electrode that does not include an adhesive layer, an electrode formed from an electrode substrate such as previously described may be used without any specific limitations.

<Electrolysis Solution>

An organic electrolysis solution obtained by dissolving a supporting electrolyte in an organic solvent is normally used as an electrolysis solution. The supporting electrolyte may, for example, be a lithium salt in the case of a lithium ion secondary battery. Examples of lithium salts that may be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable as they readily dissolve in solvents and exhibit a high degree of dissociation. One electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolysis solution is not specifically limited so long as the supporting electrolyte can dissolve therein. Suitable examples in the case of a lithium ion secondary battery include carbonates such as dimethyl carbonate (DMC), ethylene carbonate (EC), diethyl carbonate (DEC), propylene carbonate (PC), butylene carbonate (BC), and methyl ethyl carbonate (MEC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixed liquid of such solvents may be used. Of these solvents, carbonates are preferable due to having a high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolysis solution may be adjusted as appropriate. Furthermore, known additives may be added to the electrolysis solution.

<Production Method of Non-Aqueous Secondary Battery>

The non-aqueous secondary battery can be produced by, for example, overlapping the positive electrode and the negative electrode with the separator in-between, placing the resultant positive electrode-separator-negative electrode laminate in a battery container as produced or after rolling, folding, or the like as necessary, injecting the electrolysis solution into the battery container, and sealing the battery container. In order to prevent pressure increase inside the battery and occurrence of overcharging or overdischarging, an expanded metal; an overcurrent preventing device such as a fuse or a PTC device; or a lead plate may be provided in the battery container as necessary. The shape of the battery may be a coin type, button type, sheet type, cylinder type, prismatic type, flat type, or the like.

EXAMPLES

The following provides a more specific description of the present disclosure based on examples. However, the present disclosure is not limited to the following examples. In the following, "%" and "parts" used to express quantities are by mass, unless otherwise specified.

Moreover, in the case of a polymer that is produced through copolymerization of a plurality of types of monomers, the proportion constituted in the polymer by a structural unit formed through polymerization of a given monomer is normally, unless otherwise specified, the same as the ratio (charging ratio) of the given monomer among all monomers used in polymerization for forming the polymer.

In the examples and comparative examples, the following methods were used to measure and evaluate various glass-transition temperatures, the 1 mass % viscosity of a water-soluble polymer, the viscosity and coatability of a composition for an adhesive layer, the density and adhesiveness of an adhesive layer, and the low-temperature output characteristics of a secondary battery.

<Glass-Transition Temperature>

[Preparation of Measurement Sample]

With respect to organic particles 1 and 3 to 7 produced in the examples and comparative examples, which each had a core-shell structure, a polymer was separately produced as a glass-transition temperature measurement sample with the same compounding ratio as a polymer forming the shell portion. With respect to organic particles 2 and 8 and a binder for an adhesive layer produced in the examples, which did not have a core-shell structure, solvent was removed from an obtained water dispersion and then solid content was dried to obtain a glass-transition temperature measurement sample.

[Measurement of Glass-Transition Temperature]

The glass-transition temperature of the organic particles and binder for an adhesive layer was measured by measuring a DSC curve in accordance with JIS K 6240 using a differential scanning calorimeter (EXSTAR DSC6220 produced by SII NanoTechnology Inc.). Specifically, 10 mg of the dried measurement sample was weighed into an aluminum pan and then a DSC curve was measured in a measurement temperature range of −100° C. to 200° C. with a heating rate of 20° C./min and using an empty aluminum pan as a reference. The temperature at a heat absorption peak of a derivative signal (DDSC) during the heating process was determined and was taken to be the glass-transition temperature of the measured organic particles or binder for an adhesive layer.

<1 Mass % Viscosity of Water-Soluble Polymer>

A 1 mass % aqueous solution of each water-soluble polymer used in the examples and comparative examples was prepared with deionized water. The obtained 1 mass % aqueous solution was adjusted to pH 8 with 1% sodium hydroxide aqueous solution and then the viscosity of the solution was measured using a B-type viscometer (TVB-10M produced by Toki Sangyo Co., Ltd.) at pH 8, 25° C., and 60 rpm. The used rotor was changed as appropriate depending on the viscosity.

<Viscosity of Composition for Adhesive Layer>

At standard temperature and standard humidity (JIS Z 8703), a rheometer (MCR 302 produced by Anton Paar) was used to measure viscosity $\eta_0$ at a shear rate of 100 s$^{-1}$ and a temperature of 25° C. and viscosity $\eta_1$ at a shear rate of 10,000 s$^{-1}$ and a temperature of 25° C. The obtained values for $\eta_0$ and $\eta_1$ were used to calculate the ratio ($\eta_0/\eta_1$) of $\eta_0$ relative to <Coatability of Composition for Adhesive Layer>

Adhesive layers obtained in the examples and comparative examples were observed by eye while shining light from a side corresponding to a substrate onto which the adhesive layer had been applied. In a case in which "streaks" or "unevenness" are present in the adhesive layer, there is a visually distinguishable difference in the amount of light that is transmitted. In the present specification, the term "streaks" refers to recesses and protrusions that may arise at the surface of the adhesive layer under the influence of an applicator used in application of the composition for an adhesive layer and that mainly occur in cases in which the aforementioned $\eta_0/\eta_1$ value is large. Moreover, "unevenness" refers to non-uniformity of the layer thickness of the applied adhesive layer that mainly occurs in cases in which the aforementioned $\eta_0/\eta_1$ value is small. A visual judgment of whether "streaks" or "unevenness" are present in an observation target adhesive layer can be made in accordance with a distribution pattern of the amount of transmitted light. A composition for an adhesive layer that forms an adhesive layer capable of transmitting light uniformly has good coatability, whereas a composition for an adhesive layer that forms an adhesive layer in which "streaks" or "unevenness" arise has poor coatability. Therefore, the coatability of a composition for an adhesive layer was evaluated in accordance with the following standard.

Good: The formed adhesive layer transmits light uniformly.

Streaks: The formed adhesive layer has line-shaped regions in which the amount of transmitted light clearly varies.

Unevenness: The formed adhesive layer has regions in which the amount of transmitted light varies irregularly without a clear boundary.

<Density of Adhesive Layer>

Ten specimens of 10 cm in width and 10 cm in length were cut out from a substrate having an adhesive layer that was obtained in each example and comparative example. An average value $W_1$ (g) of the masses of the cut-out specimens was measured. Moreover, the thickness of each specimen was measured at the four corners and center thereof (five locations in total) and the average value of the measured thicknesses was taken to be the thickness $T_1$ (μm) of the specimen. Moreover, substrates that were used in the examples and comparative examples were cut out in the same manner prior to application of an adhesive layer thereon, and the mass $W_0$ (g) and thickness $T_0$ (μm) of each substrate was measured by the same measurement method. The density ρ of the adhesive layer was calculated from the obtained values by the following equation. The calculated value for the density ρ was evaluated in accordance with the following standard.

$$\rho = (W_1 - W_0)/(T_1 - T_0) \times 100$$

A: Adhesive layer density of less than 0.6 g/cm$^3$

B: Adhesive layer density of at least 0.6 g/cm$^3$ and less than 0.8 g/cm$^3$

C: Adhesive layer density of 0.8 g/cm$^3$ or more

<Adhesiveness of Adhesive Layer>

A separator (cases other than Example 8) or electrode (Example 8) produced in each of the examples and comparative examples was cut out to 10 mm in width and 50 mm in length. In a case in which a separator included the adhesive layer (cases other than Example 8), the separator was stacked with a positive or negative electrode substrate including an electrode mixed material layer, and in a case in which an electrode included the adhesive layer (Example 8), the electrode was stacked with a separator substrate. Roll pressing was then performed at a temperature of 80° C. and a load of 10 kN/m to obtain a specimen. The obtained specimen was attached to an adhesion surface of cellophane tape (JIS Z 1522) with the surface at the current collector side of the electrode (positive electrode or negative electrode) underneath. Note that the cellophane tape was fixed to a horizontal test bed in advance such that the adhesion surface thereof was on top. One end at the separator side of the specimen was pulled in a vertically upward direction at a pulling rate of 50 mm/min and the stress during peeling was measured. This measurement was performed for three specimens having a separator-positive electrode structure and three specimens having a separator-negative electrode structure (i.e., six times in total). An average value of the measurement results was taken to be the peel strength. A higher peel strength indicates higher adhesiveness between the separator and the positive/negative electrode. The adhesiveness was evaluated in accordance with the following standard. The results are shown in Table 1.

A: Peel strength of 10 N/m or more

B: Peel strength of at least 5 N/m and less than 10 N/m

C: Peel strength of less than 5 N/m

<Low-Temperature Output Characteristics>

A produced lithium ion secondary battery was left at rest for 24 hours at an ambient temperature of 25° C. Thereafter, a charge operation was performed for 5 hours at a charge rate of 0.1C and an ambient temperature of 25° C., and the voltage $V_0$ after the charge operation was measured.

Next, a discharge operation was performed at a discharge rate of 1 C and an ambient temperature of −10° C., and the voltage $V_1$ at a point 15 seconds after the start of discharging was measured. The voltage change ΔV was calculated by an equation ΔV=$V_0$−$V_1$. A smaller value for the voltage change ΔV indicates better secondary battery low-temperature output characteristics. Secondary battery low-temperature output characteristics were evaluated in accordance with the following standard. The results are shown in Table 1.

SA: Voltage change ΔV of less than 250 mV
A: Voltage change ΔV of at least 250 mV and less than 350 mV
B: Voltage change ΔV of at least 350 mV and less than 500 mV
C: Voltage change ΔV of 500 mV or more Example 1

<Preparation of Organic Particles>

Organic particles 1 having a core-shell structure were prepared for use as organic particles. First, 38.5 parts of methyl methacrylate monomer and 28.63 parts of butyl acrylate as (meth)acrylic acid ester monomers, 2.8 parts of methacrylic acid monomer as an acid group-containing monomer, and 0.07 parts of allyl methacrylate as a crosslinkable monomer were added into a 5 MPa pressure vessel equipped with a stirrer for formation of a core portion. In addition, 1 part of sodium dodecylbenzenesulfonate as an emulsifier, 150 parts of deionized water, and 0.5 parts of potassium persulfate as a polymerization initiator were added into the pressure vessel and were sufficiently stirred. Thereafter, the inside of the vessel was heated to 60° C. to initiate polymerization. At the point at which the polymerization conversion rate reached 96%, 29.7 parts of styrene and 0.3 parts of methacrylic acid monomer were continuously added into the vessel for formation of a shell portion, the inside of the vessel was heated to 70° C., and polymerization was continued until the polymerization conversion rate reached 96%, at which point, the reaction was terminated by cooling. As a result, a water dispersion containing organic particles 1 was obtained. The glass-transition temperature of the obtained organic particles 1 was measured by the previously described method. The result is shown in Table 1.

<Preparation of Binder for Adhesive Layer>

A reaction vessel equipped with a stirrer was charged with 70 parts of deionized water, 0.15 parts of sodium lauryl sulfate (produced by Kao Corporation; product name: EMAL 2F) as an emulsifier, and 0.5 parts of ammonium persulfate. The gas phase of the reaction vessel was purged with nitrogen gas and the inside of the reaction vessel was heated to 60° C.

A monomer mixture was obtained in a separate vessel by adding and mixing 50 parts of deionized water, 0.5 parts of sodium dodecylbenzenesulfonate as a dispersant, and 94 parts of butyl acrylate, 2 parts of acrylonitrile, 2 parts of methacrylic acid, 1 part of N-methylolacrylamide, and 1 part of allyl glycidyl ether as polymerizable monomers. The monomer mixture was continuously added into the aforementioned reaction vessel over 4 hours while carrying out a polymerization reaction. During addition, the reaction was carried out at 60° C. The inside of the reaction vessel was heated to 70° C. once addition was completed and the reaction was continued for 3 hours under stirring. The reaction was subsequently terminated by cooling. In this manner, a water dispersion containing a (meth)acrylic polymer as a binder for an adhesive layer was produced. The glass-transition temperature of the obtained binder for an adhesive layer as measured by the previously described method was −38° C.

<Preparation of Water-Soluble Polymer>

A synthetic water-soluble polymer 1 (synthetic WP 1) was produced for use as a water-soluble polymer. A 5 MPa pressure vessel equipped with a stirrer was charged with 34 parts of methacrylic acid as an ethylenically unsaturated carboxylic acid monomer, 65 parts of ethyl acrylate as a (meth)acrylic acid ester monomer, 1.0 parts of ethylene glycol dimethacrylate as a crosslinkable monomer, 1.0 parts of polyoxyalkylene alkenyl ether ammonium sulfate, 150 parts of deionized water, and 0.5 parts of potassium persulfate as a polymerization initiator. These materials were sufficiently stirred and then the inside of the vessel was heated to 60° C. to initiate polymerization. At the point at which the polymerization conversion rate reached 96%, cooling was performed to terminate the reaction and yield a water dispersion containing a water-soluble polymer.

Next, the water dispersion containing the water-soluble polymer and 5 mass % sodium hydroxide aqueous solution were added into a vessel that was equipped with a stirrer and had been charged with deionized water in a formulation that was adjusted such that the resultant solution had a pH of 8 and the concentration of the water-soluble polymer in the resultant solution was 1 mass %. Sufficient stirring was performed to dissolve the water-soluble polymer. In this manner, a water-soluble polymer aqueous solution was produced.

<Preparation of Composition for Non-Aqueous Secondary Battery Adhesive Layer>

A vessel equipped with a stirrer was charged with 100 parts by mass of the organic particles, 2 parts by mass (in terms of solid content) of the water-soluble polymer aqueous solution, and 22 parts by mass (in terms of solid content) of the binder for an adhesive layer, and these materials were mixed. Moreover, 1 part of a surface tension modifier (ethylene oxide-propylene oxide copolymer) was added and dilution was performed with deionized water to yield a composition for an adhesive layer having a solid content concentration of 30 mass %.

<Formation of Adhesive Layer for Non-Aqueous Secondary Battery>

The composition for an adhesive layer obtained as described above was applied onto a separator substrate (made of polypropylene; Celgard 2500) and was dried for 3 minutes at 50° C. This operation was performed with respect to both sides of the separator substrate to obtain a separator including an adhesive layer having a thickness of 1 μm at each side of the separator. The density and adhesiveness of the obtained adhesive layer-containing separator were evaluated as previously described. The results are shown in Table 1.

<Preparation of Negative Electrode>

A 5 MPa pressure vessel equipped with a stirrer was charged with 33 parts of 1,3-butadiene, 3.5 parts of itaconic acid, 63.5 parts of styrene, 0.4 parts of sodium dodecylbenzenesulfonate as an emulsifier, 150 parts of deionized water, and 0.5 parts of potassium persulfate as a polymerization initiator. These materials were sufficiently stirred and then the inside of the vessel was heated to 50° C. to initiate polymerization. At the point at which the polymerization conversion rate reached 96%, cooling was performed to terminate the reaction and yield a mixture containing a particulate binder (SBR). The mixture containing the particulate binder was adjusted to a pH of 8 through addition of 5 mass % sodium hydroxide aqueous solution. Thereafter, unreacted monomer was removed by thermal-vacuum distillation. Cooling was then performed to 30° C. or lower to yield a water dispersion containing the particulate binder.

After 100 parts of artificial graphite (average particle diameter: 15.6 μm) and 1 part in terms of solid content of a 2% aqueous solution of carboxymethyl cellulose (MAC350HC produced by Nippon Paper Industries Co., Ltd.) as a thickener had been adjusted to a solid content concentration of 68 mass % with deionized water, mixing was performed for 60 minutes at 25° C.

The solid content concentration was further adjusted to 62 mass % with deionized water and further mixing was performed for 15 minutes at 25° C. The above-described particulate binder was added to the resultant mixed liquid in an amount of 1.5 parts in terms of solid content, further deionized water was added to adjust the final solid content concentration to 52 mass %, and further mixing was performed for 10 minutes. The resultant mixture was subjected to a defoaming process under reduced pressure to yield a slurry composition for a negative electrode having good fluidity.

The slurry composition for a negative electrode that was obtained as described above was applied onto copper foil (current collector) of 20 μm in thickness using a comma coater such as to have a thickness after drying of approximately 150 μm. The applied slurry composition was dried by conveying the copper foil inside a 60° C. oven at a speed of 0.5 m/min over a period of 2 minutes. Thereafter, heat treatment was performed for 2 minutes at 120° C. to obtain a pre-pressing negative electrode web. The pre-pressing negative electrode web was rolled by roll pressing to obtain a post-pressing negative electrode (single-sided negative electrode) including a negative electrode mixed material layer of 80 μm in thickness.

<Preparation of Positive Electrode>

N-Methyl-2-pyrrolidone (NMP) was mixed with 100 parts of $LiCoO_2$ having a volume-average particle diameter of 12 μm as a positive electrode active material, 2 parts of acetylene black (HS-100 produced by Denki Kagaku Kogyo Kabushiki Kaisha) as a conductive material, and 2 parts (in terms of solid content) of PVDF (#7208 produced by Kureha Corporation) as a binder to adjust the total solid content concentration to 70 mass %. These materials were mixed using a planetary mixer to produce a slurry composition for a positive electrode.

The slurry composition for a positive electrode obtained as described above was applied onto aluminum foil (current collector) of 20 μm in thickness using a comma coater such as to have a thickness after drying of approximately 150 μm. The applied slurry composition was dried by conveying the aluminum foil inside a 60° C. oven at a speed of 0.5 m/min over a period of 2 minutes. Thereafter, heat treatment was performed for 2 minutes at 120° C. to obtain a pre-pressing positive electrode web. The pre-pressing positive electrode web was rolled by roll pressing to obtain a post-pressing positive electrode (single-sided positive electrode) including a positive electrode mixed material layer of 80 μm in thickness.

<Production of Lithium Ion Secondary Battery>

The post-pressing positive electrode obtained as described above was cut out as a square piece having a 4 cm side length. Moreover, the separator including the adhesive layer for a non-aqueous secondary battery that was obtained as described above was cut out as a square piece having a 5 cm side length. The separator square piece was placed on a surface at the positive electrode mixed material layer side of the cut-out positive electrode square piece. The post-pressing negative electrode prepared as described above was also cut out as a square piece having a 4.2 cm side length and was placed on the separator square piece such that a surface at the negative electrode mixed material layer side thereof faced toward the separator square piece. Next, the resultant laminate was adhered through pressing at 60° C. and 0.5 MPa.

The adhered laminate was then enclosed in an aluminum packing case used as a battery case. An electrolysis solution (solvent: ethylene carbonate (EC)/diethyl carbonate (DEC)/vinylene carbonate (VC) (volume ratio)=68.5/30/1.5; electrolyte: $LiPF_6$ of 1 M in concentration) was injected into the aluminum packing case such that no air remained. Next, an opening of the aluminum packing case was heat sealed at 150° C. to tightly close the aluminum packing case and thereby produce a 40 mAh laminate-type lithium ion secondary battery.

The low-temperature output characteristics of the obtained laminate-type lithium ion secondary battery were evaluated as previously described. The results are shown in Table 1.

Examples 2 and 3

Various measurements and evaluations were carried out in the same way as in Example 1 with the exception that the formulation of the water-soluble polymer was changed as shown in Table 1 in order to produce a synthetic water-soluble polymer 2 (synthetic WP 2) or a synthetic water-soluble polymer 3 (synthetic WP 3). The results are shown in Table 1.

Example 4

Various measurements and evaluations were carried out in the same way as in Example 1 with the exception that a water-soluble polymer aqueous solution in which the concentration of carboxymethyl cellulose CMC 1 (MAC800LC produced by Nippon Paper Industries Co., Ltd.) as a water-soluble polymer was adjusted to 0.8 mass % with deionized water was used, and 0.5 parts by mass (in terms of solid content) of the water-soluble polymer aqueous solution was compounded relative to 100 parts by mass of the organic particles. The results are shown in Table 1.

Examples 5 and 6

Various measurements and evaluations were carried out in the same way as in Example 4 with the exception that carboxymethyl cellulose CMC 2 (MAC350HC produced by Nippon Paper Industries Co., Ltd.) (Example 5) or xanthan gum (KELZAN produced by Sansho Co., Ltd.) (Example 6) was used as the water-soluble polymer. The results are shown in Table 1.

Example 7

Various measurements and evaluations were carried out in the same way as in Example 1 with the exception that organic particles 2 prepared as described below were used as the organic particles. The results are shown in Table 1.

<Preparation of Organic Particles 2>

A 5 MPa pressure vessel equipped with a stirrer was charged with 65.0 parts of methyl methacrylate monomer, 30.0 parts of butyl acrylate, 4.0 parts of methacrylic acid monomer, and 1.0 parts of ethylene glycol dimethacrylate as a crosslinkable monomer. In addition, 1 part of sodium dodecylbenzenesulfonate as an emulsifier, 150 parts of deionized water, and 0.5 parts of potassium persulfate as a polymerization initiator were added and were sufficiently stirred. Thereafter, the inside of the vessel was heated to 60° C. to initiate polymerization. At the point at which the polymerization conversion rate reached 96%, cooling was performed to terminate the reaction. In this manner, a water dispersion containing organic particles 2 that did not have a core-shell structure was obtained.

Example 8

Organic particles and a water-soluble polymer were produced, and a composition for a non-aqueous secondary battery adhesive layer was produced in the same way as in Example 1. Moreover, a lithium ion secondary battery was produced in the same way as in Example 1 with the exception that, in production of the lithium ion secondary battery, the separator substrate was used as a separator without forming an adhesive layer, and an adhesive layer-containing negative electrode and an adhesive layer containing positive electrode were used as the positive and negative electrodes. Various measurements and evaluations were carried out as previously described. The preparation methods of the adhesive layer-containing negative electrode and the adhesive layer-containing positive electrode were as follows.

<Preparation of Adhesive Layer-Containing Negative/Positive Electrode>

A negative/positive electrode mixed material layer of 80 μm in thickness was formed on a current collector in the same way as in Example 1 to obtain an electrode substrate. Thereafter, the composition for an adhesive layer was applied onto a surface at the negative electrode/positive electrode mixed material layer side of the electrode substrate and was dried for 3 minutes at 50° C. In this manner, a negative/positive electrode including an adhesive layer of 1 μm in thickness at one side thereof was prepared.

Example 9

Various measurements and evaluations were carried out in the same way as in Example 1 with the exception that organic particles 3 prepared as described below were used as the organic particles. The results are shown in Table 1.

<Preparation of Organic Particles 3>

First, 41.1 parts of methyl methacrylate monomer and 28.63 parts of butyl acrylate as (meth)acrylic acid ester monomers, 0.2 parts of methacrylic acid monomer as an acid group-containing monomer, and 0.07 parts of allyl methacrylate as a crosslinkable monomer were added into a 5 MPa pressure vessel equipped with a stirrer for formation of a core portion. In addition, 1 part of sodium dodecylbenzenesulfonate as an emulsifier, 150 parts of deionized water, and 0.5 parts of potassium persulfate as a polymerization initiator were added into the pressure vessel and were sufficiently stirred. Thereafter, the inside of the vessel was heated to 60° C. to initiate polymerization. At the point at which the polymerization conversion rate reached 96%, 29.7 parts of styrene and 0.3 parts of methacrylic acid monomer were continuously added into the vessel for formation of a shell portion, the inside of the vessel was heated to 70° C., and polymerization was continued until the polymerization conversion rate reached 96%, at which point, the reaction was terminated by cooling. In this manner, a water dispersion containing organic particles 3 was obtained.

Example 10

Various measurements and evaluations were carried out in the same way as in Example 1 with the exception that organic particles 4 prepared as described below were used as the organic particles. The results are shown in Table 1.

<Preparation of Organic Particles 4>

First, 37.1 parts of methyl methacrylate monomer and 28.63 parts of butyl acrylate as (meth)acrylic acid ester monomers, 4.2 parts of methacrylic acid monomer as an acid group-containing monomer, and 0.07 parts of allyl methacrylate as a crosslinkable monomer were added into a 5 MPa pressure vessel equipped with a stirrer for formation of a core portion. In addition, 1 part of sodium dodecylbenzenesulfonate as an emulsifier, 150 parts of deionized water, and 0.5 parts of potassium persulfate as a polymerization initiator were added into the pressure vessel and were sufficiently stirred. Thereafter, the inside of the vessel was heated to 60° C. to initiate polymerization. At the point at which the polymerization conversion rate reached 96%, 29.7 parts of styrene and 0.3 parts of methacrylic acid monomer were continuously added into the vessel for formation of a shell portion, the inside of the vessel was heated to 70° C., and polymerization was continued until the polymerization conversion rate reached 96%, at which point, the reaction was terminated by cooling. In this manner, a water dispersion containing organic particles 4 was obtained.

Example 11

Various measurements and evaluations were carried out in the same way as in Example 1 with the exception that organic particles 5 prepared as described below were used as the organic particles. The results are shown in Table 1.

<Preparation of Organic Particles 5>

First, 38.3 parts of methyl methacrylate monomer and 28.63 parts of butyl acrylate as (meth)acrylic acid ester monomers, 0.2 parts of acrylamide monomer, 2.8 parts of methacrylic acid monomer as an acid group-containing monomer, and 0.07 parts of allyl methacrylate as a crosslinkable monomer were added into a 5 MPa pressure vessel equipped with a stirrer for formation of a core portion. In addition, 1 part of sodium dodecylbenzenesulfonate as an emulsifier, 150 parts of deionized water, and 0.5 parts of potassium persulfate as a polymerization initiator were added into the pressure vessel and were sufficiently stirred. Thereafter, the inside of the vessel was heated to 60° C. to initiate polymerization. At the point at which the polymerization conversion rate reached 96%, 29.7 parts of styrene and 0.3 parts of methacrylic acid monomer were continuously added into the vessel for formation of a shell portion, the inside of the vessel was heated to 70° C., and polymerization was continued until the polymerization conversion rate reached 96%, at which point, the reaction was terminated by cooling. In this manner, a water dispersion containing organic particles 5 was obtained.

Examples 12 and 13

Organic particles 6 and 7 were prepared in Examples 12 and 13, respectively, in the same way as in Example 11 with the exception that the charged amounts of methyl methacrylate monomer and acrylamide monomer in production of the organic particles were changed as shown in Table 1. Various measurements and evaluations were carried out in the same way as in Example 1. The results are shown in Table 1.

Example 14

Various measurements and evaluations were carried out in the same way as in Example 1 with the exception that organic particles 8 prepared as described below were used as the organic particles. The results are shown in Table 1.

<Preparation of Organic Particles 8>

A 5 MPa pressure vessel equipped with a stirrer was charged with 64.0 parts of methyl methacrylate monomer, 30.0 parts of butyl acrylate, 4.0 parts of methacrylic acid monomer, 1.0 parts of acrylamide, and 1.0 parts of ethylene glycol dimethacrylate as a crosslinkable monomer. In addition, 1 part of sodium dodecylbenzenesulfonate as an emulsifier, 150 parts of deionized water, and 0.5 parts of potassium persulfate as a polymerization initiator were added into the pressure vessel and were sufficiently stirred. Thereafter, the inside of the vessel was heated to 60° C. to initiate polymerization. At the point at which the polymerization conversion rate reached 96%, cooling was performed to terminate the reaction. In this manner, a water dispersion containing organic particles 8 that did not have a core-shell structure was obtained.

Comparative Example 1

Various measurements and evaluations were carried out in the same way as in Example 1 with the exception that carboxymethyl cellulose CMC 3 (D1220 produced by Daicel Corporation) was used as the water-soluble polymer, and 0.5 parts by mass of the water-soluble polymer was compounded relative to 100 parts by mass of the organic particles. The results are shown in Table 1.

Comparative Example 2

Various measurements and evaluations were carried out in the same way as in Example 4 with the exception that 3 parts by mass in terms of solid content of the water-soluble polymer aqueous solution was used relative to 100 parts by mass of the organic particles in preparation of the composition for a non-aqueous secondary battery adhesive layer. The results are shown in Table 1.

Comparative Example 3

Various measurements and evaluations were carried out in the same way as in Example 5 with the exception that 10 parts by mass in terms of solid content of the water-soluble polymer aqueous solution was used relative to 100 parts by mass of the organic particles in preparation of the composition for a non-aqueous secondary battery adhesive layer. The results are shown in Table 1.

In Table 1, shown below:
"MMA" indicates methyl methacrylate;
"BA" indicates butyl acrylate;
"ST" indicates styrene;
"MA" indicates methacrylic acid;
"AAm" indicates acrylamide;
"AMA" indicates allyl methacrylate;
"EDMA" indicates ethylene glycol dimethacrylate;
"MAA" indicates methacrylic acid;
"EA" indicates ethyl acrylate;
"WP" indicates water-soluble polymer;
"CMC 1" indicates MAC800LC produced by Nippon Paper Industries Co., Ltd.;
"CMC 2" indicates MAC350HC produced by Nippon Paper Industries Co., Ltd.; and
"CMC 3" indicates D1220 produced by Daicel Corporation.

TABLE 1

| | | | Examples | | | | | | | | | |
|---|---|---|---|---|---|---|---|---|---|---|---|---|
| | | | 1 | 2 | 3 | 4 | 5 | 6 | 7 | 8 | 9 |
| Composition for adhesive layer | Organic particles | Type | Organic particles 1 | Organic particles 1 | Organic particles 1 | Organic particles 1 | Organic particles 1 | Organic particles 1 | Organic particles 2 | Organic particles 1 | Organic particles 3 |
| | | Chemical composition MMA [mass %] | 38.5 | 38.5 | 38.5 | 38.5 | 38.5 | 38.5 | 65.0 | 38.5 | 41.1 |
| | | BA [mass %] | 28.63 | 28.63 | 28.63 | 28.63 | 28.63 | 28.63 | 30.0 | 28.63 | 28.63 |
| | | ST [mass %] | 29.7 | 29.7 | 29.7 | 29.7 | 29.7 | 29.7 | — | 29.7 | 29.7 |
| | | MA [mass %] | 3.1 | 3.1 | 3.1 | 3.1 | 3.1 | 3.1 | 4.0 | 3.1 | 0.5 |
| | | AAm [mass %] | — | — | — | — | — | — | — | — | — |
| | | AMA [mass %] | 0.07 | 0.07 | 0.07 | — | — | 0.07 | — | 0.07 | 0.07 |
| | | EDMA [mass %] | — | — | — | — | — | — | 1.0 | — | — |
| | | Amount [parts by mass] | 100 | 100 | 100 | 100 | 100 | 100 | 100 | 100 | 100 |
| | | Glass-transition temperature [°C] | 105 | 105 | 105 | 105 | 105 | 105 | 60 | 105 | 105 |
| | Water-soluble polymer | Type | Synthetic WP 1 | Synthetic WP 2 | Synthetic WP 3 | CMC 1 | CMC 2 | Xanthan gum | Synthetic WP 1 | Synthetic WP 1 | Synthetic WP 1 |
| | | Chemical composition MAA [mass %] | 34 | 62 | 25 | — | — | — | 34 | 34 | 34 |
| | | EA [mass %] | 65 | 37 | 74 | — | — | — | 65 | 65 | 65 |
| | | EDMA [mass %] | 1 | 1 | 1 | — | — | — | 1 | 1 | 1 |
| | | Amount [parts by mass] | 4500 | 7500 | 1200 | 5000 | 3000 | 3500 | 4500 | 4500 | 4500 |
| | Properties | 1 Mass % aqueous solution viscosity [mPa·s] | 2 | 2 | 2 | 0.5 | 0.5 | 0.5 | 2 | 2 | 2 |
| | | η₀ [mPa·s] | 90 | 180 | 40 | 80 | 40 | 50 | 90 | 110 | 150 |
| | | η₀/η₁ | 3.0 | 4.5 | 2.0 | 2.7 | 1.6 | 2.0 | 3.0 | 2.7 | 5.0 |
| Adhesive layer formation location | | | Separator | Separator | Separator | Separator | Separator | Separator | Separator | Electrodes | Separator |
| Evaluations | Coatability | | Good | Slight streaks | Slight unevenness | Good | Slight unevenness | Slight unevenness | Good | Good | Slight streaks |
| | Adhesive layer density | | A | A | B | A | B | B | A | A | A |
| | Adhesive layer adhesiveness | | A | A | B | A | B | B | A | A | B |
| | Secondary battery low-temperature output characteristics | | A | B | A | A | A | A | A | A | B |

TABLE 1-continued

| | | | Examples | | | | | Comparative Examples | | |
|---|---|---|---|---|---|---|---|---|---|---|
| | | | 10 | 11 | 12 | 13 | 14 | 1 | 2 | 3 |
| Composition for adhesive layer | Organic particles | Type | Organic particles 4 | Organic particles 5 | Organic particles 6 | Organic particles 7 | Organic particles 8 | Organic particles 1 | Organic particles 1 | Organic particles 1 |
| | | Chemical composition MMA [mass %] | 37.1 | 38.3 | 37.5 | 29.0 | 64.0 | 38.5 | 38.5 | 38.5 |
| | | BA [mass %] | 28.63 | 28.63 | 28.63 | 28.63 | 30.0 | 28.63 | 28.63 | 28.63 |
| | | ST [mass %] | 29.7 | 29.7 | 29.7 | 29.7 | — | 29.7 | 29.7 | 29.7 |
| | | MA [mass %] | 4.5 | 0.2 | 1.0 | 3.1 | 4.0 | 3.1 | 3.1 | 3.1 |
| | | AAm [mass %] | — | — | — | 9.5 | — | — | — | — |
| | | AMA [mass %] | 0.07 | 0.07 | 0.07 | 0.07 | 1.0 | 0.07 | 0.07 | 0.07 |
| | | EDMA [mass %] | — | — | — | — | 1.0 | — | — | — |
| | Amount [parts by mass] | | 100 | 100 | 100 | 100 | 100 | 100 | 100 | 100 |
| | Glass-transition temperature [° C.] | | 105 | 105 | 105 | 105 | 60 | 105 | 105 | 105 |
| | Water soluble polymer | Type | Synthetic WP 1 | Synthetic WP 1 | Synthetic WP 1 | Synthetic WP 1 | Synthetic WP 1 | CMC 3 | CMC 1 | CMC 2 |
| | | Chemical composition MAA [mass %] | 34 | 34 | 34 | 34 | 34 | — | — | — |
| | | EA [mass %] | 65 | 65 | 65 | 65 | 65 | — | — | — |
| | | EDMA [mass %] | 1 | 1 | 1 | 1 | 1 | — | — | — |
| | | 1 Mass % aqueous solution viscosity [mPa · s] | 4500 | 4500 | 4500 | 4500 | 4500 | 1000 | 5000 | 3000 |
| | | Amount [parts by mass] | 2 | 2 | 2 | 2 | 2 | 0.5 | 3 | 10 |
| | Properties | $\eta_0$ [mPa · s] | 190 | 100 | 80 | 50 | 80 | 8 | 200 | 220 |
| | | $\eta_0/\eta_1$ | 2.0 | 2.5 | 3.0 | 4.6 | 4.0 | 1.5 | 5.5 | 3.5 |
| Adhesive layer formation location | | | Separator Slight unevenness | Separator Good | Separator Good | Separator Slight streaks | Separator Good | Separator Unevenness | Separator Streaks | Separator Streaks |
| Evaluations | Coatability | | | | | | | | | |
| | Adhesive layer density | | B | A | A | B | A | C | A | B |
| | Adhesive layer adhesiveness | | B | A | A | A | A | C | A | B |
| | Secondary battery low-temperature output characteristics | | B | A | SA | B | SA | B | C | C |

Examples 1 to 14 demonstrate that when a composition for a non-aqueous secondary battery adhesive layer contains organic particles and a water-soluble polymer having a 1 mass % aqueous solution viscosity of at least 500 mPa·s and not more than 9,000 mPa·s, and has a viscosity $\eta_0$ at a shear rate of 100 s$^{-1}$ of at least 10 mPa·s and not more than 200 mPa·s, and a ratio of $\eta_0$ relative to viscosity $\eta_1$ at a shear rate of 10,000 s$^{-1}$ of at least 1.5 and not more than 5.0, the composition has excellent coatability, an adhesive layer formed using the composition has reduced density and excellent adhesiveness, and low-temperature output characteristics of a secondary battery including the adhesive layer are sufficiently improved. On the other hand, in the case of Comparative Examples 1 to 3 in which the composition for a secondary battery adhesive layer did not satisfy these properties, it can be seen that coatability of the composition for an adhesive layer, density and adhesiveness of an adhesive layer, and low-temperature output characteristics of a secondary battery could not be improved with a good balance.

INDUSTRIAL APPLICABILITY

According to this disclosure, it is possible to provide a composition for a non-aqueous secondary battery adhesive layer that is capable of forming an adhesive layer that displays excellent adhesiveness and can provide a secondary battery with excellent low-temperature output characteristics.

Moreover, according to this disclosure, it is possible to provide an adhesive layer for a non-aqueous secondary battery that has excellent adhesiveness and can cause a non-aqueous secondary battery to display excellent low-temperature output characteristics.

Furthermore, according to this disclosure, it is possible to provide a non-aqueous secondary battery having excellent low-temperature output characteristics.

The invention claimed is:

1. A composition for a non-aqueous secondary battery adhesive layer comprising:
    organic particles; and
    a water-soluble polymer including a (meth)acrylic acid ester monomer unit in a percentage content of 15 mass % or more, wherein
    the water-soluble polymer has a 1 mass % aqueous solution viscosity of at least 500 mPa·s and not more than 9,000 mPa·s,
    viscosity $\eta_0$ of the composition for a non-aqueous secondary battery adhesive layer at a shear rate of 100 s$^{-1}$ is at least 10 mPa·s and not more than 200 mPa·s, and
    a ratio of $\eta_0$ relative to viscosity $\eta_1$ of the composition for a non-aqueous secondary battery adhesive layer at a shear rate of 10,000 s$^{-1}$ is at least 1.5 and not more than 5.0.

2. The composition for a non-aqueous secondary battery adhesive layer according to claim 1, wherein
    the water-soluble polymer includes an ethylenically unsaturated carboxylic acid monomer unit in a proportion of at least 20 mass % and not more than 70 mass %.

3. The composition for a non-aqueous secondary battery adhesive layer according to claim 1, wherein
    the organic particles include an acid group-containing monomer unit.

4. The composition for a non-aqueous secondary battery adhesive layer according to claim 1, wherein
    the organic particles include a (meth)acrylamide monomer unit.

5. An adhesive layer for a non-aqueous secondary battery formed using the composition for a non-aqueous secondary battery adhesive layer according to claim 1.

6. A non-aqueous secondary battery comprising the adhesive layer for a non-aqueous secondary battery according to claim 5.

7. The non-aqueous secondary battery according to claim 6, wherein
    the non-aqueous secondary battery is a wound type or a laminate type.

8. The composition for a non-aqueous secondary battery adhesive layer according to claim 1, wherein
    viscosity $\eta_0$ of the composition for the non-aqueous secondary battery adhesive layer at the shear rate of 100 s$^{-1}$ is at least 40 mPa·s.

* * * * *